United States Patent
Croxford et al.

(10) Patent No.: US 10,943,115 B2
(45) Date of Patent: Mar. 9, 2021

(54) PROCESSING IMAGE DATA TO PERFORM OBJECT DETECTION

(71) Applicants: Apical Ltd, Cambridge (GB); Arm Limited, Cambridge (GB)

(72) Inventors: Daren Croxford, Swaffham Prior (GB); Roberto Lopez Mendez, Cambridge (GB)

(73) Assignees: Apical Ltd., Cambridge (GB); Arm Limited, Cambridge (GB)

( * ) Notice: Subject to any disclaimer, the term of this patent is extended or adjusted under 35 U.S.C. 154(b) by 162 days.

(21) Appl. No.: 16/044,153

(22) Filed: Jul. 24, 2018

(65) Prior Publication Data

US 2020/0034617 A1    Jan. 30, 2020

(51) Int. Cl.
| | | |
|---|---|---|
| G06K 9/00 | (2006.01) | |
| G06T 7/70 | (2017.01) | |
| G01C 21/32 | (2006.01) | |
| G06N 3/04 | (2006.01) | |

(52) U.S. Cl.
CPC ......... G06K 9/00664 (2013.01); G01C 21/32 (2013.01); G06K 9/00604 (2013.01); G06N 3/0454 (2013.01); G06T 7/70 (2017.01)

(58) Field of Classification Search
CPC .. G06K 9/00664; G06K 9/00604; G06T 7/70; G01C 21/32; G06N 3/0454
See application file for complete search history.

(56) References Cited

U.S. PATENT DOCUMENTS

| | | | | |
|---|---|---|---|---|
| 9,818,029 | B2* | 11/2017 | Lee | G06K 9/00604 |
| 10,019,058 | B2* | 7/2018 | Kawana | H04N 5/765 |
| 10,586,360 | B2* | 3/2020 | DeLuca | G06F 3/013 |
| 2012/0275642 | A1* | 11/2012 | Aller | G06F 3/04886 382/100 |
| 2014/0079297 | A1* | 3/2014 | Tadayon | G06K 9/00288 382/118 |
| 2014/0168056 | A1* | 6/2014 | Swaminathan | G06F 3/147 345/156 |
| 2015/0286873 | A1* | 10/2015 | Davis | G06F 1/1694 382/103 |
| 2016/0171299 | A1* | 6/2016 | Lee | G06F 3/017 382/128 |
| 2017/0123492 | A1* | 5/2017 | Marggraff | H04N 5/247 |
| 2018/0053056 | A1* | 2/2018 | Rabinovich | G06K 9/627 |
| 2018/0365882 | A1* | 12/2018 | Croxford | G06T 7/70 |
| 2019/0050664 | A1* | 2/2019 | Yang | G06F 3/012 |
| 2019/0223716 | A1* | 7/2019 | Abou Shousha | A61B 3/0025 |

* cited by examiner

*Primary Examiner* — Kim Y Vu
*Assistant Examiner* — Molly Delaney
(74) *Attorney, Agent, or Firm* — EIP US LLP

(57) ABSTRACT

Examples of the present disclosure relate to methods for performing object detection. In one such example, data representing an image is received. The image comprises at least one target region and a further region. The at least one target region is identifiable using data indicative of a gaze direction of a viewer of the image. A first portion of the data is processed using a first processing scheme to perform object detection in the at least one target region of the image. The first portion of the data represents the at least one target region of the image. A second portion of the data is processed using a second, different, processing scheme. The second portion of the data represents the further region of the image.

19 Claims, 5 Drawing Sheets

PROCESSING IMAGE DATA TO PERFORM OBJECT DETECTION

BACKGROUND OF THE INVENTION

Technical Field

The present invention relates to methods, apparatus and computer-readable media for performing object detection.

Description of the Related Technology

The ability to detect and identify objects within an image has applications in many types of system, such as virtual reality (VR), augmented reality (AR), mixed reality (MR), smart glasses and/or computer vision systems. Object detection can be a computationally expensive task, however, particularly for relatively large images.

Such high quality, high resolution images are becoming more widespread. For example, where the display panel on which an image or video is being displayed is positioned very close to the viewer, for example in a head-mounted display (HMD) arrangement, high resolution and/or high frame rate video data may be required in order to provide visual satisfaction. Furthermore, such devices may require image or video data to be captured, processed and displayed in substantially real time. Efficient processing is thus an important consideration in such systems.

Some image processing systems may be subject to physical constraints, e.g. in order to be easily wearable. For example, some systems may be required to be relatively small and/or lightweight. This may be the case for HMDs, smart glasses, etc. In order to operate within such physical constraints, such systems may be equipped with limited processing, power, storage and/or battery capabilities.

SUMMARY

According to a first aspect of the present disclosure, there is provided a method of performing object detection, comprising: receiving data representing an image, the image comprising at least one target region and a further region, the at least one target region being identifiable using data indicative of a gaze direction of a viewer of the image; processing a first portion of the data using a first processing scheme to perform object detection in the at least one target region of the image, the first portion representing the at least one target region; and processing a second portion of the data using a second, different, processing scheme, the second portion representing the further region.

According to a second aspect of the present disclosure, there is provided an apparatus for performing object detection, the apparatus comprising: a receiver configured to receive data representing an image, the image comprising at least one target region and a further region, the at least one target region being identifiable using data indicative of a gaze direction of a viewer of the image; and a processor configured to: process a first portion of the data using a first processing scheme to perform object detection in the at least one target region of the image, the first portion representing the at least one target region; and process a further portion of the data using a second, different, processing scheme, the further portion representing the further region.

According to a third aspect of the present disclosure, there is provided a non-transitory computer-readable storage medium comprising a set of computer readable instructions which, when executed by at least one processor, cause the at least one processor to: receive data representing an image, the image comprising at least one target region and a further region, the at least one target region being identifiable using data indicative of a gaze direction of a viewer of the image; process a first portion of the data using a first processing scheme to perform object detection in the at least one target region of the image, the first portion representing the at least one target region; and process a further portion of the data using a second, different, processing scheme, the further portion representing the further region.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
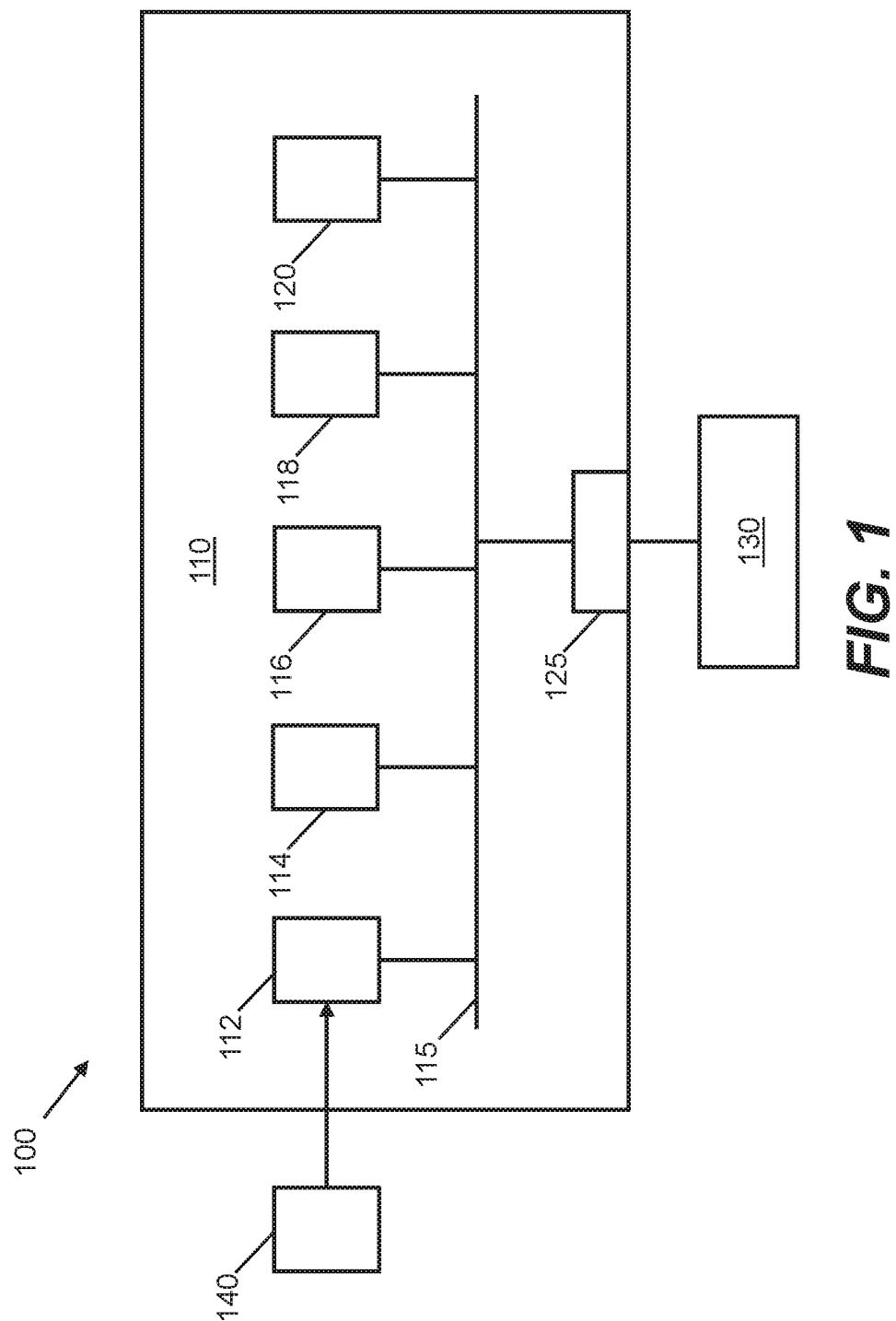
FIG. 1 shows schematically a system for implementing an image processing pipeline.

FIG. 1, provided for context, shows schematically a system 100 for implementing an image processing pipeline. The system 100 may form part of VR, AR, MR and/or computer vision (CV) equipment. Some or all of the components of the system 100 may be comprised in a wearable device such as an HMD or smart glasses. The system 100 may form part of robotic mapping and/or navigation equipment, autonomous vehicle equipment, and/or unmanned aerial vehicle equipment. The system 100 may form part of other image processing arrangements in other examples. For example, the system 100 may form part of a television, mobile device or video gaming equipment.

The system 100 comprises an image processing apparatus 110. The image processing apparatus 110 is arranged to receive, process, generate, store and/or output image data. The image processing apparatus 110 may form part of or comprise a system on a chip (SoC) arrangement.

The image processing apparatus 110 comprises a plurality of processor components that are communicatively coupled via at least one bus 115. The at least one bus 115 has a limited bandwidth. Operations performed by the processor components may be carried out by hardware and/or software. Each of the processor components may be implemented using machine readable instructions and suitably programmed or configured hardware, such as circuitry. Each of the processor components can include a microprocessor, microcontroller, processor module or subsystem, programmable integrated circuit, programmable gate array or other computing device. The processor components may comprise multiple co-located processors or multiple disparately located processors. In some examples, the apparatus 110 comprises computer-useable volatile and/or non-volatile memory configured to store information and/or instructions for the processor components. The computer-useable volatile and/or non-volatile memory may be coupled with the bus 115. The computer-useable memory may comprise random access memory (RAM) and/or read-only memory (ROM).

In this example, the image processing apparatus 110 comprises an image signal processor (ISP) 112, a central processing unit (CPU) 114, a graphics processing unit (GPU) 116, a CV engine 118, a display controller 120 and a memory controller 125. Each of the ISP 112, CPU 114, GPU 116, CV engine 118, display controller 120 and memory controller 125 may comprise a processor component of the apparatus 110. The apparatus 110 may comprise more, fewer and/or different components than those shown in the example of FIG. 1. For example, the apparatus 110 may comprise a video decoder and/or one or more peripherals or input/output devices.

The memory controller 125 may comprise a dynamic memory controller (DMC). The memory controller 125 is coupled to a memory 130. The memory controller 125 is configured to manage the flow of data going to and from the memory 130. The memory 130 may comprise a main memory, otherwise referred to as a "primary memory". The memory 130 may be an external memory, in that the memory 130 is external to the image processing apparatus 110. For example, the memory 130 may comprise 'off-chip" memory. The memory 130 may comprise a central memory of a computing device within which the apparatus 110 is located. The memory 130 may have a greater storage capacity than the memory cache(s) of the CPU 114 and/or the GPU 116. In some examples, the memory 130 is comprised in the image processing apparatus 110. For example, the memory 130 may comprise 'on-chip' memory. The memory 130 may for example comprise a magnetic or optical disk and disk drive or a solid-state drive (SSD). In some examples, the memory 130 comprises a synchronous dynamic random-access memory (SDRAM). For example, the memory 130 may comprise a double data rate synchronous dynamic random-access memory (DDR-SDRAM). The memory 130 may be arranged to store image data corresponding to one or more images, each image corresponding to a different frame in a video. The stored image data may correspond to successive images in a video stream. The memory 130 may comprise a framebuffer arranged to store the image data.

In this example, the ISP 112 is configured to receive signal data from a sensor 140. For example, the ISP 112 may be configured to receive image data from an image sensor communicatively coupled to the ISP 112. The sensor 140 may be comprised in a camera. For example, the sensor 140 may be comprised in an "over the ear" camera, which is arranged to capture a representation of a scene that is being viewed by a viewer. The received signal data may comprise analog or digital data. Such an image sensor may comprise a plurality of sensor pixels, a given sensor pixel being configured to output signal data corresponding to that sensor pixel. The signal data received by the ISP 112 may comprise raw sensor data. For example, the sensor data may comprise raw image data. Raw image data comprises unprocessed or minimally processed data generated by an image sensor. The ISP 112 may be configured to process image data received from the sensor 140. In some examples, the ISP 112 is configured to receive and process image data from a video decoder (not shown). The video decoder may be configured to receive encoded image or video data, and decode the received encoded data. The video decoder may output decoded image data. The video decoder may be used in addition to or instead of the image sensor 140, according to some examples. The ISP 112 is configured to output processed data to the memory 130 via the bus 115 and memory controller 125. For example, the processed data may be output to a framebuffer in the memory 130.

The CPU 114 may comprise an image or video processor configured to process image or video data. The CPU 114 may be equipped with various image processing-related functionality. For example, the CPU 114 may be configured to perform object detection and/or recognition tasks, etc. The CPU 114 may be configured to obtain image data from the memory 130, or from the ISP 114. The CPU 114 may be configured to output processed data to the memory 130 via the bus 115 and memory controller 125.

The GPU 116 is configured to process image or video data. The GPU 116 may comprise a greater number of cores or processing units than the number of cores in the CPU 114. Each of the cores of the GPU 116 may, individually, be relatively slow and/or unsophisticated compared to any of the cores of the CPU 114. A given core of the GPU 116 may therefore be less suitable for performing complex computational tasks compared with a given core of the CPU 114. However, the relatively large number of cores in the GPU 116 enables certain computational tasks, for example tasks with a relatively high degree of parallelism, to be performed more efficiently by the GPU 116 than by the CPU 114 since a relatively large number of processes may be carried out in parallel by the GPU 116. Examples of image-related computational tasks that may be performed more efficiently by the GPU 116 than by the CPU 114 include, but are not limited to, image rendering processes such as texture mapping, rendering polygons, shading, geometric calculations and motion compensation. The GPU 116 may be configured to perform object detection and/or recognition tasks. The GPU 116 may also be used to perform tasks that are not image-related. The GPU 116 may be configured to obtain image data from the memory 130. In some examples, the GPU 116 obtains image data directly from the CPU 114 or a further processing unit such as the ISP 112. The GPU 116 is configured to process the image data, for example to generate a rendered image, and to output the generated data to the memory 130 via the bus 115 and memory controller 125. For example, the generated data may be stored in a framebuffer.

The CV engine 118 is configured to process image or video data. In some examples, the CV engine 118 is comprised in the CPU 114 and/or the GPU 116. That is, CV functionality may be incorporated into the CPU 114 and/or the GPU 116. In other examples, the CV engine 118 is a separate processing component. CV functionality may include the processing of image data to extract relatively high-level information describing the content of the image. High dimensional data may be extracted in order to produce numerical or symbolic information, e.g. in the form of decisions. The extracted information may be used in conjunction with decision-making processes to elicit actions and/or to further understanding of the image. CV functionality may include performing object detection and/or recognition. CV functionality may include other tasks such as motion estimation, scene reconstruction or image restoration. In some examples, CV functionality includes performing simultaneous localization and mapping (SLAM). SLAM comprises generating and/or updating a map of an environment whilst simultaneously determining and/or tracking a location of a sensor within the environment. SLAM processing may involve identifying and locating objects in the environment, and using those identified objects as semantic "landmarks" to facilitate the accurate and/or efficient mapping of the environment.

Performing object detection and/or recognition may involve the use of one or more trained artificial neural networks (ANNs). Using an ANN to perform object detection and/or recognition may increase an accuracy and/or reliability of object detection and/or recognition compared to some known techniques. An ANN may be trained to detect and locate objects in an image, and/or to classify those objects using a plurality of predefined object classes or types.

The CV engine 118 may be configured to obtain image data from the memory 130. In some examples, the CV engine 118 obtains image data directly from the CPU 114, GPU 116 or ISP 112. The CV engine 118 is configured to process the image data, for example to perform object detection in the image, and to output data, e.g. data indicating detected and/or classified objects, to the memory 130.

In some examples, the image processing apparatus 110 is communicatively couplable to a display device (not shown). Examples of display devices include, but are not limited to, HMDs, monitors, televisions, display panels and wearable display equipment. The display device may be arranged remotely from the image processing apparatus 110. The display device and the image processing apparatus 110 may be arranged in separate physical housings in some examples. In other examples, the display device and the image processing apparatus 110 are comprised in the same physical housing. The apparatus 110 may be couplable to the display device via a display interface (not shown). The display interface may be referred to as a "display link". The display interface may comprise a display serial interface (DSI). A DSI is an interface via which image or video data can be streamed to a display.

The display controller 120 may be referred to as a "display processor". The display controller 120 may comprise a video shifter. The display controller 120 may be configured to obtain image or video data from the memory 130, e.g. via the bus 115. In some cases, the display controller 120 is configured to receive image or video data directly from the CPU 114, GPU 116 or CV engine 118, i.e. without the image data having first been stored in and retrieved from the memory 130. The display controller 120 may be configured to process the obtained image or video data and generate a serial bitstream. A serial bitstream is a sequence of bits. The generated serial bitstream may then be used to output an image or video signal. The serial bitstream may be output for transmission via a display interface to a display device. In some examples, the display controller 120 is responsible for video timing signals. Video timing signals may be used to synchronize component video data. Component video data is video data that is split into two or more component channels. For example, video data may be split into separate color channels. The display controller 120 may be configured with various other image or video processing functionality. For example, the display controller 120 may be configured with upscaling and/or downscaling functionality.

The system 100 may comprise more, fewer and/or different components than those shown in the example of FIG. 1.

Image data may be relatively large, particularly as the use of higher resolution, higher frequency and/or higher pixel density video displays has increased. For example, some AR, VR or MR systems require one or two high resolution displays, e.g. one or two 1920×1080 pixel displays, each operating at a high frequency, e.g. 90 or 120 Hz, in order for the displays to be positioned close to the eyes of a user whilst maintaining a high level of perceived visual quality.

Performing object detection may be a computationally expensive task, requiring relatively large amounts of processing power and/or storage. ANN-based object detection may be particularly resource-intensive, although it may be more accurate and/or reliable than other object detection methods. Further, the amount of processing, storage, power and/or time required to perform accurate object detection may increase with image size. It may be desirable, in some systems, to perform 'continuous' object detection, e.g. for 'always on' CV or AR systems which receive and process live video streams. To perform accurate and/or reliable object detection for successive frames of a live video stream, latency is thus also a consideration. Some systems may be equipped with insufficient compute capabilities, e.g. in terms of processing hardware, storage and/or power, to process relatively large images sufficiently quickly, or even at all.

Figure 2:
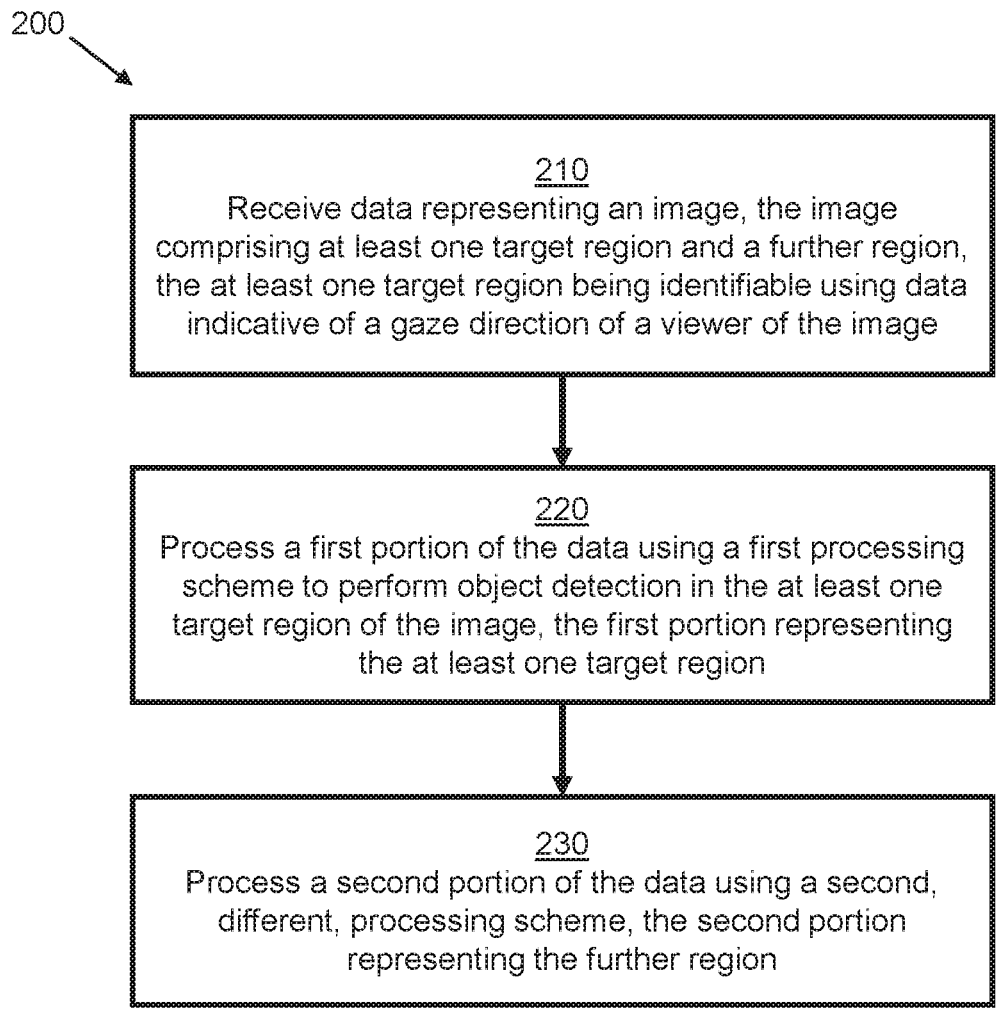
FIG. 2 shows schematically a method of performing object detection according to an example.

FIG. 2 shows schematically a method 200 for performing object detection according to an aspect of the present disclosure. At least one portion of the method 200 may be implemented by the image processing apparatus 110 shown in FIG. 1.

In an example, at least one portion of the method 200 is implemented by executable code, stored on a non-transitory storage medium, that includes instructions, that when executed by at least one processor, causes the at least one processor to perform the at least one portion of the method 200 described herein. In another case, at least one portion of the method 200 is implemented by at least one ASIC. The ASIC may be standard, fully customized or partially customized. In one example, the ASIC may have a structured design. The ASIC may comprise at least one microprocessor and/or at least one memory block. In another example, the ASIC comprises at least one gate array such as a field-programmable gate array. The field-programmable gate array may comprise an array of programmable logic blocks and a hierarchy of reconfigurable interconnects. The array of programmable logic blocks may, in some examples, comprise memory elements such as flip-flops. The computer readable instructions may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

At block 210, data representing an image is received. In some examples, the image is a frame of a video comprising a sequence of multiple such frames.

In some examples, the received data comprises raw image data output from an image sensor. The data may comprise pixel data. The data may be received from the image sensor, for example via a sensor interface. The data received from the image sensor may be uncompressed or compressed data. Operating on raw image data enables the described methods to be performed by an ISP communicatively coupled to an image sensor and arranged to receive signal data either directly or indirectly from the image sensor. In some examples, the received data comprises decoded image data output from a video decoder.

In some examples, the data representing the image is received from memory. For example, the data may comprise processed data that was stored in memory, e.g. in a framebuffer, after being generated by a processing entity such as an ISP, CPU or GPU. As such, the received data may comprise processed data or raw image data.

The image comprises at least one target region and a further region. The at least one target region is identifiable using data indicative of a gaze direction of a viewer of the image. In some examples, the at least one target region corresponds to a field of view in the image of a viewer. The at least one target region may correspond exactly to the field of view of the viewer or may, for example, be slightly larger than but encompass the field of view of the viewer. The at least one target region may comprise at least one region of interest. In an example, the at least one target region corresponds to one or more fixation points of a viewer, for example in that the fixation point(s) may be within the at least one target region of the image. The at least one target region may comprise multiple target regions or only one target region. When the image is of a 360 degree environment, for example a classical music concert, a user experiencing that environment, for example through the use of a virtual reality HMD or mobile phone, may only be viewing a sub-region of the environment at any given time and not the entire environment. The further region of the image may be outside of the field of view of the viewer of the image. In some examples, the further region surrounds the at least one target region. The further region may correspond to a region that a viewer is not looking at and/or is unlikely to be looking at. The further region may, for example, comprise one or more peripheral regions of the image that surround a focus region.

In some examples, data indicative of the gaze direction of the viewer is received. The at least one target region may be identified using the data indicative of the gaze direction. The data indicative of the gaze direction may comprise eye-tracking data. Eye-tracking data may be generated by an eye-tracking sensor. As such, the data indicative of the gaze direction of the viewer may be received from an eye-tracking sensor. Such a sensor may be arranged in an HMD, for example. In some examples, the data indicative of the gaze direction comprises data indicating the at least one target region. The data indicating the at least one target region may have been derived based on eye-tracking data. As such, the data indicative of the gaze direction may be obtained either directly or indirectly from an eye-tracking mechanism. In some examples, the data indicative of the gaze direction is not obtained using an eye-tracking mechanism. For example, the data indicative of the gaze direction may be obtained using a head-tracking mechanism. The data indicative of the gaze direction may comprise data indicating an image region at which a viewer is looking and/or is predicted to be looking.

At block 220, a first portion of the data is processed. The first portion of the data represents the at least one target region. The first portion of the data is processed using a first processing scheme. In some examples, the first processing scheme involves processing at a first level of visual quality. For example, the first processing scheme may involve processing at a first spatial and/or temporal resolution. In some examples, the first processing scheme involves processing with a first processing rate. A processing rate may correspond to a frequency with which data is processed. In some examples, the first processing scheme involves compressing according to a first compression ratio. The first portion of the data is processed to perform object detection in the at least one target region of the image, as will be described in more detail below.

At block 230, a second portion of the data is processed using a second, different, processing scheme. The second portion represents the further region. As such, an image may comprise multiple regions, and different processing schemes may be used to process image data representing each of the different regions.

In some examples, processing the second portion of the data comprises discarding the second portion of the data. For example, the second portion of the data may be deleted or otherwise not used for further processing. By discarding the second portion of the data, the image may be cropped such that the further region is no longer represented by the resulting image data. For example, an image may be cropped to retain only the at least one target region relating to the gaze direction of the viewer. By discarding the second portion of the data, an amount of image data that is subsequently processed, transmitted and/or stored is reduced compared to a case in which the second portion of the data is not discarded. Latency and power consumption in downstream image processing stages, e.g. in an object detection state, may therefore be reduced. In other examples, the second portion of the data is not discarded.

In examples where the first processing scheme involves processing at a first level of visual quality, the second processing scheme may involve processing at a second, different, level of visual quality. For example, the second processing scheme may involve processing at a lower level of quality than that used in the first processing scheme. The second processing scheme may involve processing at a lower spatial and/or temporal resolution than that used in the first processing scheme. Processing at a lower level of quality may reduce an amount of processing power and/or time compared to processing at a higher level of quality. Finite processing resources may therefore be redistributed and/or focused to prioritize an image region where the viewer is looking, e.g. the at least one target region. Thus processing image data may be made more efficient, by reducing processing for the peripheral regions. Focusing processing resources in image regions where the viewer is looking and/or is likely to be looking may enable an overall reduction in processing resources for processing the image as a whole, and/or may enable an increase in available processing resources for the target region, thereby enabling more efficient and/or effective processing in that target region. In some examples, the second processing scheme involves processing at a higher level of quality than that used in the first processing scheme.

In examples where the first processing scheme involves processing with a first processing rate, the second processing scheme may involve processing with a second, different, processing rate. For example, the second processing scheme may involve processing image data less frequently than in the first processing scheme. Where a video stream comprising a sequence of images is to be processed, the first processing scheme may involve processing every image in the sequence, whereas the second processing scheme may involve processing only every 2nd, 3rd, or 4th image in the sequence, for example. As such, a processing burden may be reduced when using the second processing scheme compared to the first processing scheme. By reducing the processing rate for the further region, processing of the image data may be made more efficient. Additionally or alternatively, processing resources may be concentrated away from the further region onto the at least one target region. In some examples, the second processing scheme involves processing image data more frequently than in the first processing scheme.

In examples where the first processing scheme involves compressing according to a first compression ratio, the second processing scheme may involve compressing according to a second, different, compression ratio. In some examples, the second compression ratio is higher than the first compression ratio. For example, the first compression ratio (as a ratio between uncompressed size and compressed size) may be 3:2, and the second compression ratio may be 3:1. As such, the further portion of the received data may be compressed more aggressively than the first portion of the received data. In some examples, the second compression ratio is lower than the first compression ratio. As such, the further portion of the first data may be compressed less aggressively than the first portion of the received data.

In some examples, processing a given portion of the received data comprises discarding a predetermined number of least significant bits (LSBs) in the given portion of the received data. Discarding LSBs may reduce an amount of loss of visual quality compared to a case in which bits other than LSBs are discarded. The predetermined number is associated with the given portion. In such examples, the first processing scheme may involve discarding a first number of LSBs and the second processing scheme may involve discarding a second, different, number of LSBs. As such, different numbers of LSBs may be discarded for different regions of the image. For example, a smaller number of bits may be discarded for the at least one target region, which may be for display at a relatively high level of quality, and a greater number of bits may be discarded for the further region, which may be for display at a relatively low level of quality. In some examples, all bits for the further region are discarded. In other words, in such examples, the second portion of the first data may be discarded altogether.

In some examples, the first processing scheme involves performing lossless or visually lossless compression on the first portion of the received data. Lossless compression is a type of data compression in which the original uncompressed data can be reconstructed from the compressed data. Visually lossless compression is a type of lossy compression in which the data that is lost as a result of compression and de-compression is not detectable to the eye. In some examples, the first portion of the received data is not compressed. Processing the further portion of the received data may comprise performing lossy compression on the further portion of the received data. In lossy compression, not all of the uncompressed data can be recovered from the compression and de-compression process.

By processing the first and second portions of the received data using different compression ratios, an amount of data used to represent the image may be reduced without reducing a perceived visual level of quality. Reducing the amount of data used to represent the image facilitates more efficient image data processing. Additionally, reducing the amount of data used to represent an image enables the latency in receiving, processing, generating and/or outputting such data to be reduced without the expense of having to increase the bandwidth of interconnects or display links of an image processing system.

In some examples, processing the first portion of the received data comprises deriving first processed data, and processing the second portion of the received data comprises deriving second processed data. In examples, the first processed data only of the first processed data and the second processed data is outputted. As such, the second processed data is not outputted in such examples. The first processed data may be outputted to memory and/or may be transmitted to a display device, for example. Outputting the first processed data only of the first processed data and the second processed data reduces an amount of data to be stored, transmitted and/or further processed compared to a case in which both the first processed data and the second processed data are outputted.

As described above, the first portion of the received image data is processed to perform object detection in the at least one target region. In some examples, processing the second portion of the received data using the second processing scheme comprises performing object detection in the further region of the image. In other examples, however, object detection is not performed in the further region of the image.

In some examples, processing the first portion of the received data using the first processing scheme comprises using a first artificial neural network (ANN) to perform object detection and/or object recognition in the at least one target region. The first ANN may have a first network structure, e.g. a first configuration of layers and neurons.

In some examples, the second processing scheme involves using a second ANN. The second ANN may be used to perform object detection and/or recognition in the further region of the image, for example. The second ANN may have a different number of layers and/or a different number of neurons compared to the first ANN. As such, the second ANN may have a different network structure compared to the first ANN. The second ANN may be smaller and/or less complex than the first ANN. As such, using the second ANN may be less processor-intensive and/or time-consuming than using the first ANN. The second ANN may, however, be less accurate and/or less reliable in performing object detection and/or object recognition compared to the first ANN. Therefore, for the at least one target region of the image, a relatively complex but sophisticated ANN may be used to perform object detection and/or recognition tasks, whereas for the further image region a relatively simple but more computationally-lightweight ANN may be used. Processing resources may therefore be deployed more effectively, by focusing such resources on the image region(s) where the viewer is looking or likely to be looking.

In some examples, the second ANN has the same structure as the first ANN. In some examples, the second processing scheme involves using the first ANN. As such, the first processing scheme and the second processing scheme may both involving using the same ANN. In such examples, the inputs to the first ANN may be different for different image regions. For example, image data for the at least one target region may be input to the first ANN at a higher level of quality and/or a higher rate than image data for the further region. In some examples, the first ANN may be used in conjunction with a first number of object classes for the at least one target region, and with a second, different, number of object classes for the further region. For example, a greater number of object classes may be used in the first processing scheme than in the second processing scheme.

In some examples, processing the first portion of the received data using the first processing scheme comprises performing object recognition in the at least one target region. Performing object recognition may comprise performing object detection. In some examples, object detection is performed in an initial processing stage, and object recognition is performed in a subsequent processing stage, e.g. to identify or classify the detected object(s). Processing the second portion of the received data using the second processing scheme may comprise not performing object recognition in the further region of the image. As such, object detection may be performed in both the at least one target region and the further region, but object recognition may be performed in only the at least one target region. Thus processing resources associated with performing object recognition are focused towards image regions where a viewer is looking and away from image regions where a viewer is not looking. As such, an object that the viewer is actually looking at may be prioritized in terms of object recognition processing over objects that the viewer is not looking at and/or that the viewer cannot distinguish, e.g. objects in peripheral regions of the image.

In some examples, processing the first portion of the received data using the first processing scheme comprises performing object recognition with a first discriminatory power in the at least one target region of the image. Processing the second portion of the received data using the second processing scheme may comprise performing object recognition with a second, different, discriminatory power in the further region of the image. A discriminatory power may relate to an ability to distinguish between visually similar objects. For example, a given discriminatory power may correspond to a sensitivity or granularity level with which objects may be distinguished. The discriminatory power may be based on the structure and/or training of an ANN used to perform object recognition. The discriminatory power may additionally or alternatively be based on a number of distinct object classes used in object recognition. Using the first processing scheme may involve being able to discriminate between two objects having a given level of similarity, whereas using the second processing scheme may involve being unable to discriminate between those two objects.

In some examples, processing the first portion of the received data using the first processing scheme comprises performing object recognition using a first number of object classes in the at least one target region. Processing the second portion of the received data using the second processing scheme may comprise performing object recognition using a second, different, number of object classes in the further region of the image. The first number of object classes may be greater than the second number of object classes. As such, object recognition in the at least one target region may have a finer granularity than object recognition in the further region. By using fewer object classes for the further region, object recognition in the further region may require less computation and/or processing power than a case in which the same number of object classes are used for both the target region(s) and the further region. As such, processing resources for processing the further region may be reduced and/or redistributed towards the task of performing object recognition in the target region(s). In some examples, the first number of object classes is less than the second number of classes.

By increasing processing efficiency and/or reducing an amount of processing resources used for performing object detection, such object detection tasks may be performed using hardware having a relatively small form factor and/or limited processing capabilities. For example, such object detection tasks may be performed by a wearable device without having to offload such processing tasks to another computing entity or a network entity. By performing such processing tasks locally on the wearable device, latency of performing object detection may be further reduced, and the functionality of the wearable device may be increased.

In some examples, a third portion of the received data is processed using a third processing scheme. The third processing scheme is different from both the first processing scheme and the second processing scheme. The third portion of the received data represents a region of the image that is located between the at least one target region and the further region. Where the at least one target region comprises a focus region and the further region comprises a peripheral region, the region of the image represented by the third portion of the received data may be intermediate the focus region and the peripheral region. In some examples, further portions of the received data are processed in accordance with further processing schemes.

In some examples, a map representation of an environment is derived. The map representation is derived based at least in part on the processing of the first portion of the received image data. Deriving the map representation may form part of a SLAM process. As such, SLAM processing may be focused on image region(s) in which a viewer is looking, and/or away from image region(s) in which the viewer is not looking. SLAM processing that employs object recognition and scene understanding, e.g. so-called "semantic SLAM", may be made more efficient by focusing processing on the image region(s) in which a viewer is looking.

The human visual system has variable visual acuity. The human eye has most of its receptors in the fovea, which is the area of the eye responsible for sharp central vision. The fovea is small compared to the full field of vision. For some displays, such as near-eye displays, the eye can only perceive a subset of the information on the display at any instant. For some images, e.g. having a resolution of 1920× 1080 pixels, approximately 35% of the image resolution, or 672×378 pixels, is sufficient to cover the human fovea. This is approximately 8 times fewer pixels compared to the entire image. Foveated processing adapts image data processing to focus processing resources on the fovea region. More processing resources may be used to process image data in a region that the viewer is looking at, and fewer processing resources may be used to process image data in a region that viewer is not looking at. Since the viewer cannot readily distinguish objects in peripheral image regions, performing object detection and/or recognition in those regions may be an inefficient use of resources in some situations, e.g. where limited hardware resources are available. Concentrating object detection and/or recognition on the fovea region may therefore be a more efficient use of processing resources compared to a case in which object detection and/or recognition is performed across the entire image, including in regions in which objects are not distinguishable to the viewer.

Prior to receiving the data representing the rendered image, the at least one target region of the image may, in some examples, be rendered at a first level of quality, and the further region of the rendered image may be rendered at a second, different, level of quality. The image may be rendered by a GPU, for example. In some examples, the image represented by the received image data is a result of a foveated rendering process. Foveated rendering involves rendering an image region corresponding to a current fixation point of a fovea of a viewer at a higher level of quality, e.g. resolution, and rendering other image regions, e.g. peripheral regions, at a lower level of quality. Foveated rendering may reduce the rendering burden on a GPU, by rendering peripheral regions of the image at a lower resolution, rather than rendering the entire image at the highest resolution, for example. Foveated rendering may be performed based on eye-tracking data. In such examples, eye-tracking data that is already used for foveated rendering may be re-used for foveated object detection processing. This may reduce an amount of data that is generated, transmitted, processed and/or received compared to a case in which separate eye-tracking data is obtained for performing foveated object detection processing. In other examples, the at least one target region and the further region are rendered at the same level of quality. As such, foveated rendering is not performed in some examples.

Figure 3:
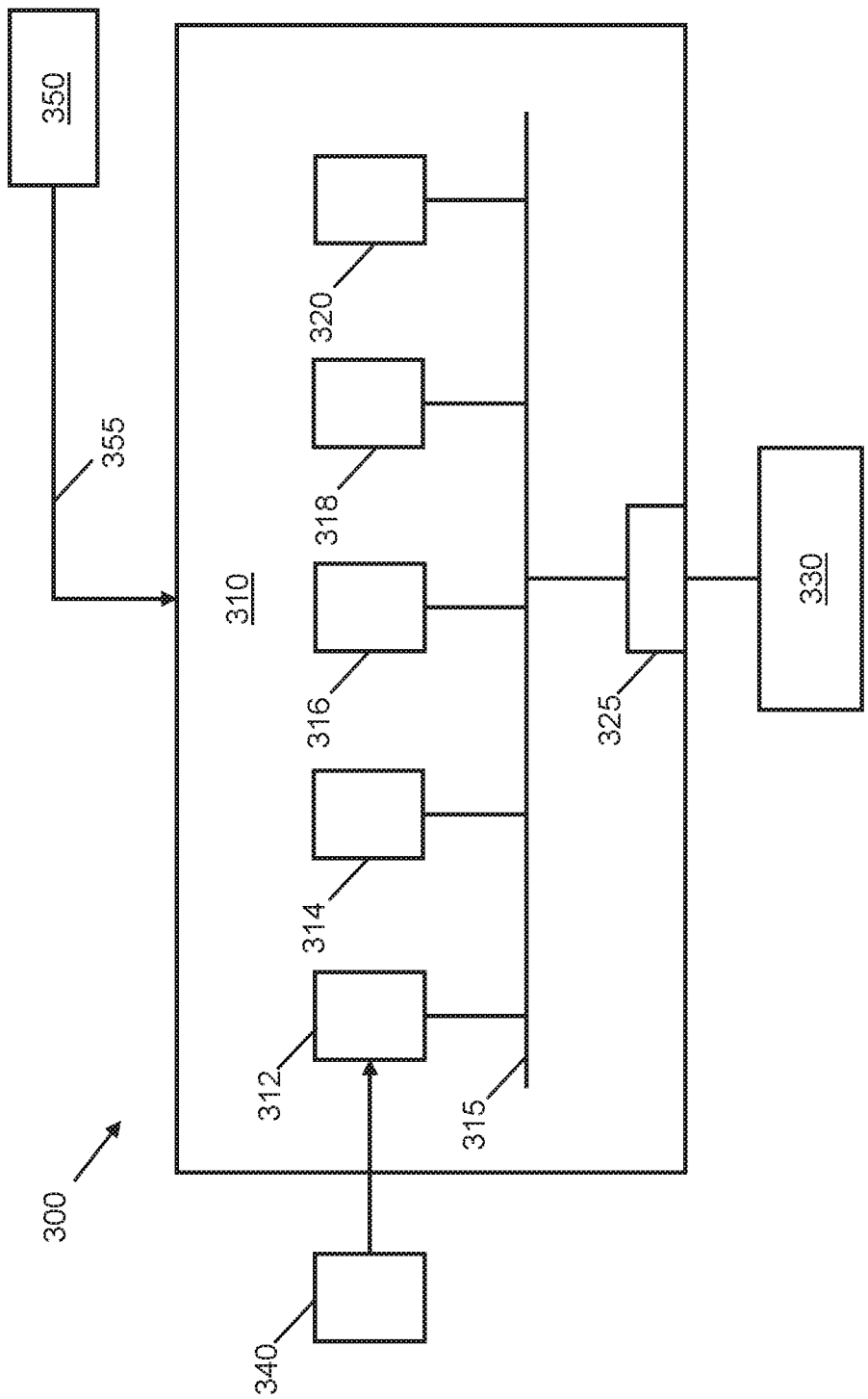
FIG. 3 shows schematically a system for implementing an image processing pipeline according to an example.

FIG. 3 shows schematically a system 300 for implementing an image processing pipeline according to an example. Components of the system 300 may be configured to perform at least a portion of the methods described herein. Some items depicted in FIG. 3 are similar to items shown in FIG. 1. Corresponding reference signs, incremented by 200, have therefore been used for similar items.

In this example, the system 300 comprises an eye-tracking device 350. The eye-tracking device 350 is configured to perform eye-tracking, also known as gaze-tracking. The eye-tracking device 350 may comprise one or more eye-tracking sensors configured to track eye movement and/or determine a gaze location and/or gaze direction of a viewer of an image. The eye-tracking device 350 may be comprised in a display device (not shown) in some examples. For example, where the display device comprises an HMD, the eye-tracking device 350 may form part of and/or be mounted upon the HMD. In other examples, the eye-tracking device 350 is separate from the display device.

The eye-tracking device 350 is configured to generate eye-tracking data 355. The eye-tracking data 355 is useable to identify at least one target image region associated with a gaze direction of a viewer. The eye-tracking data 355 may relate to a current fixation point of the fovea of at least one eye of the viewer. The at least one target region may relate to a sub-region of the image centered around the current fixation point of the fovea of the at least one eye of the viewer.

The eye-tracking device 350 is configured to output the eye-tracking data 355 to the image processing apparatus 310. In some examples, the eye-tracking data 355 is received by the image processing apparatus 310 via one or more peripherals. The eye-tracking data 355 may be received as metadata. The eye-tracking data 355, having been received by the image processing apparatus 310, may be stored in memory, for example in the central memory 330 and/or in local or 'on-chip' memory.

The image processing apparatus 310 is configured to perform foveated computation of received image data using the eye-tracking data 355, such that object detection in at least one target region of an image can be performed. The image processing apparatus 310 is configured to process different image regions differently. The number of image regions to be independently processed may be constant or variable. Independently processible image regions may have the same size or different sizes as one another, according to examples.

In some examples, the ISP 312 is configured to receive the eye-tracking data 355, or data derived therefrom, to enable the ISP 312 to infer which region(s) of a given image a viewer is looking at. The ISP 312 is configured to process a first portion of received image data, e.g. raw image data, using a first processing scheme, the first portion representing the region(s) the viewer is looking at, and process a further portion of the received image data using a second, different, processing scheme, the further portion representing a further region of the image, e.g. a peripheral region. The ISP 312 may be configured, for example, to discard the further portion of the received image data. As such, the ISP 312 may be configured to crop the received image such that only the target region(s) is retained and/or outputted. In some examples, the ISP 312 is configured to compress the further portion representing the further region more aggressively than the first portion of the image data is compressed. In some examples, the ISP 312 is configured to compress only the further portion of the first portion and the further portion. The ISP 312 may be configured to output data derived using the first portion of the image data to a framebuffer.

By configuring the ISP 312 to perform foveated computation, savings in processing resources, storage and/or power consumption may be obtained early in the image processing pipeline, for example prior to subsequent image processing stages performed by one or more of the CPU 314, GPU 316, CV engine 318 and display controller 320. Furthermore, by configuring the ISP 312 to perform foveated computation, image sensors other than foveated image sensors may be used. Foveated image sensors have different sensor pixel densities for different image regions. However, it may be difficult to vary the position of such regions, e.g. to take into account a varying gaze direction of a viewer. Further, such foveated sensors may be relatively expensive, and may require foveated sensing to be "always on" since the foveated sensors have a fixed configuration. By configuring the ISP 312 to perform foveated computation, standard image sensors may be used, and foveated processing may be used selectively, e.g. foveated processing may be switched "on" or "off" as desired, and may be adapted to the viewer's varying gaze direction.

In some examples, one or more of the CPU 314, GPU 316 and CV engine 318 is configured to perform foveated computation. Such entities may perform foveated computation in addition to or alternatively to the ISP 312 performing foveated computation. For example, the CV engine 318 may be configured to receive image data, process a target region of the image using a first processing scheme to perform object detection in the target region, and process a further region of the image using a second, different, processing scheme. The CV engine 318 may be configured to receive the eye-tracking data 355, or data derived therefrom, to enable the CV engine 318 to infer which region(s) of a given image a viewer is looking at. The received image data may have already undergone foveated computation, e.g. foveated compression and/or cropping performed by the upstream ISP 312. In other examples, the image data received by the CV engine 318 may not have undergone upstream foveated computation.

Figure 4:
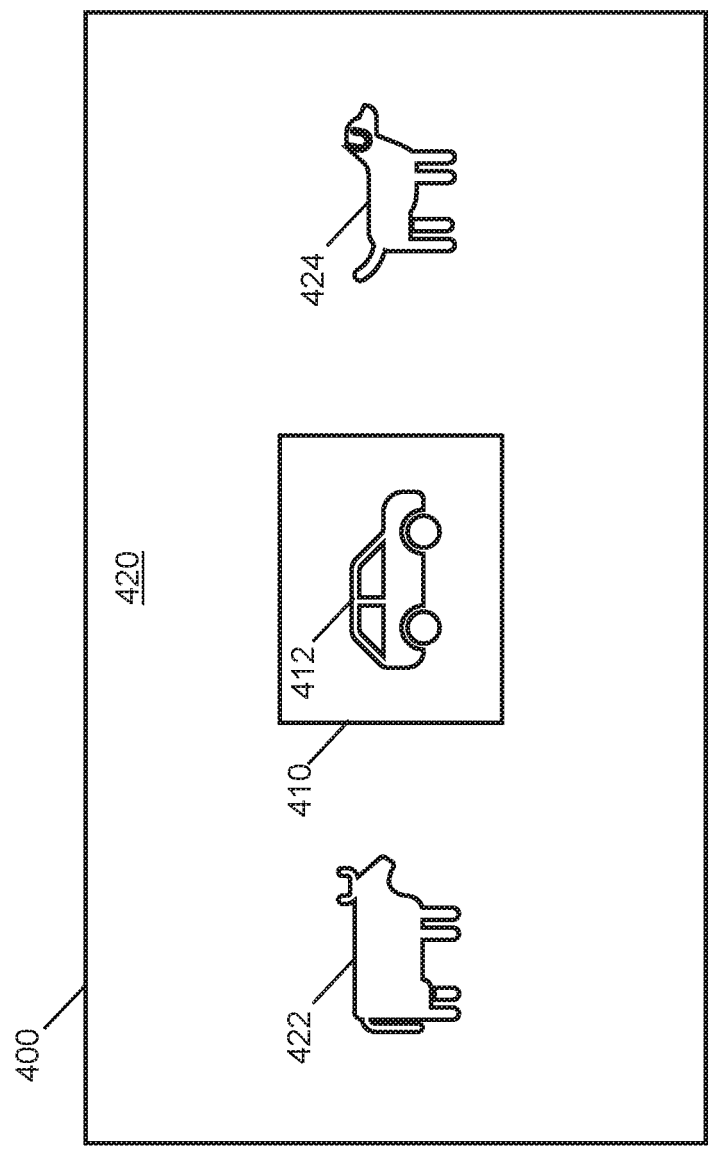
FIG. 4 shows schematically an example image in which object detection may be performed using methods such as the method of FIG. 2.

FIG. 4 shows schematically an image 400. The image 400 may for example be obtained from video data. The image 400 may be obtained based on captured image data output from one or more image sensors. The image 400 may depict a scene.

The image 400 includes a target region 410. The target region 410 is a region of interest in relation to the image 400. The target region 410 may correspond to a region of the image 400 the viewer is currently looking at and/or is likely to look at. The target region 410 is of interest in relation to the image 400 as the viewer is likely to be particularly perceptive to the level of quality of the image and/or of a level of image processing in the target region 410. In the example image 400, the target region 410 corresponds to a region of the image 400 including a car 412. Although the target region 410 is depicted as being rectangular in FIG. 4 it could take a different form. For example, the target region 410 could be circular in some examples. The target region 410 could correspond to the outline of an item of interest in the image 400, e.g. the outline of the car 412.

An image may include one or more target regions. For example, an image may include multiple target regions associated with respective different viewers, where multiple viewers are viewing the image at the same time.

The image 400 includes a further region 420. The further region 420 may correspond to a region of the image 400 that the viewer is currently not looking at and/or is unlikely to look at. In the example image 400, the further region 420 corresponds to a region of the image 400 including a cow 422 and a dog 424. The viewer is less likely to be able to distinguish objects in the further region than in the target region 410 and/or is less perceptive to the level of quality of the image in the further region 420 than in the target region 410. For example, a viewer looking at the car 412 may not notice or may not be able to distinguish the cow 422 or the dog 424, since they are outside of the fovea region of the viewer. In this example, the further region 420 surrounds the target region 410. An image may include one or more such further regions.

Object detection is performed in at least the target region 410 of the image 400, e.g. to detect the presence of the car 412. Object detection may be performed, for example, for computer vision purposes. In some cases, object detection is also performed in the further region 420, e.g. to detect the presence of the cow 422 and/or the dog 424. In some cases, however, object detection is not performed in the further region 420, thereby reducing processing resources compared to a case in which object detection is performed for the entire image. As such, object detection may only be performed in the region(s) of the image in which the viewer is looking and/or is likely to be looking in such examples, and object detection may not be performed in region(s) of the image in which the viewer cannot readily distinguish objects.

In some examples, object recognition is performed in at least the target region 410 of the image 400, e.g. to recognize the car 412. Object recognition may comprise identifying an object class or type from a plurality of possible object classes or types. The identified object class or type corresponds to a particular detected object. For example, the car 412 may be identified as a car rather than a boat or train. In an example, the car 412 may be identified as having a particular make or model, based on object recognition in the target region 410.

Object recognition may, in some examples, be performed in both the target region 410 and the further region 420. In some such examples, the discriminatory power and/or the number of possible object classes varies between the target region 410 and the further region 420. For example, in the target region 410, it may be possible to discriminate between two different models of car. In the further region 420, however, it may not be possible to discriminate between different models of car, or between different types of animal, etc., due to the reduced discriminatory power and/or number of object classes used in the further region 420.

Figure 5:
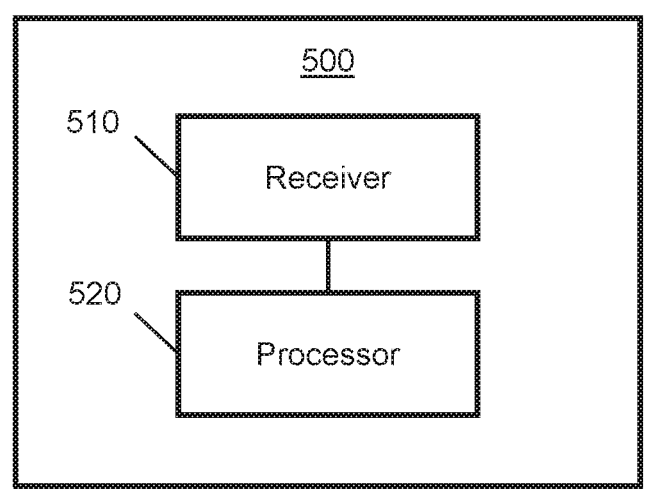
FIG. 5 shows schematically an apparatus for implementing methods such as the method of FIG. 2.

FIG. 5 shows schematically an apparatus 500 for implementing methods such as the method 200 described with reference to FIG. 2. The apparatus 500 may comprise, or be comprised in, one or more of the image processing apparatuses 110, 310, the ISPs 112, 312, the CPUs 114, 314, the GPUs, 116, 316, or the computer vision engines 118, 318 described above.

The apparatus 500 comprises a receiver 510.

The receiver 510 is configured to receive data representing an image. The image comprises at least one target region and a further region. The at least one target region is identifiable using data indicative of a gaze direction of a viewer of the image. The at least one target region is therefore associated with the gaze direction of the viewer. For example, the at least one target region may correspond to a current fixation point of a fovea of the viewer.

The apparatus 500 further comprises a processor 520. The processor 520 may be implemented using machine readable instructions and suitably programmed or configured hardware, such as circuitry.

The processor 520 is configured to process a first portion of the data representing the image using a first processing scheme to perform object detection in the at least one target region of the image. The first portion represents the at least one target region.

The processor 520 is further configured to process a second portion of the data representing the image using a second, different, processing scheme. The further portion represents the further region, different from the at least one target region. For example, the further region may comprise a peripheral region of the image.

The processor 520 is further configured to output at least the first processed data. The at least first processed data may be outputted via a display interface to a display device, for example.

Examples described above relate to image data. In other examples, other types of signal data is processed in a similar manner Examples of other types of signal data include, but are not limited to, audio data, volumetric signal data and video data.

Examples described above relate to performing object detection. In other examples, object detection is not performed. Foveated processing may be applied to other computer vision tasks, e.g. motion estimation, scene reconstruction or image restoration, in such other examples.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A method of performing object detection, comprising:
receiving data representing an image, the image comprising at least one target region and a further region, the at least one target region being identifiable using data indicative of a gaze direction of a viewer of the image;
processing a first portion of the data using a first processing scheme to perform object detection in the at least one target region of the image, the first portion representing the at least one target region; and
processing a second portion of the data using a second, different, processing scheme, the second portion representing the further region,
wherein processing the first portion of the data using the first processing scheme comprises performing object recognition with a first discriminatory power in the at least one target region, and
wherein processing the second portion of the data using the second processing scheme comprises performing object recognition with a second, different, discriminatory power in the further region.

2. A method according to claim 1, wherein processing the second portion of the data comprises discarding the second portion of the data.

3. A method according to claim 1, wherein the first processing scheme involves processing at a first level of visual quality, and the second processing scheme involves processing at a second, different, level of visual quality.

4. A method according to claim 1, wherein the first processing scheme involves processing with a first processing rate, and the second processing scheme involves processing with a second, different, processing rate.

5. A method according to claim 1, wherein the first processing scheme involves compressing according to a first compression ratio, and the second processing scheme involves compressing with a second, different, compression ratio.

6. A method according to claim 1, wherein the processing the first portion of the data comprises deriving first processed data, and the processing the second portion of the data comprises deriving second processed data, the method comprising outputting the first processed data only of the first processed data and the second processed data.

7. A method according to claim 1, wherein the received data representing the image comprises raw image data output from an image sensor.

8. A method according to claim 1, wherein the received data representing the image comprises decoded image data output from a video decoder.

9. A method according to claim 1, wherein the processing the first portion of the data using the first processing scheme comprises using a first artificial neural network to perform object detection and/or object recognition in the at least one target region.

10. A method according to claim 9, wherein the second processing scheme involves using a second artificial neural network, the second artificial neural network having a different number of layers and/or a different number of neurons compared to the first artificial neural network.

11. A method according to claim 9, wherein the second processing scheme involves using the first artificial neural network.

12. A method according to claim 1,
wherein the processing the first portion of the data using the first processing scheme comprises performing object recognition in the at least one target region, and
wherein the processing the second portion of the data using the second processing scheme comprises not performing object recognition in the further region.

13. A method according to claim 12, wherein the processing the second portion of the data using the second processing scheme comprises performing object detection in the further region.

14. A method according to claim 1, wherein processing the first portion of the data using the first processing scheme comprises performing object recognition using a first number of object classes in the at least one target region, and
wherein processing the second portion of the data using the second processing scheme comprises performing object recognition using a second, different, number of object classes in the further region.

15. A method according to claim 1, the method comprising:
processing a third portion of the data using a third processing scheme, the third processing scheme being different from both the first processing scheme and the second processing scheme, the third portion representing a region of the image that is located between the at least one target region and the further region.

16. A method according to claim 1, the method comprising deriving a map representation of an environment based at least in part on the processing of the first portion of the data.

17. A method according to claim 1, the method comprising:
receiving the data indicative of the gaze direction of the viewer from an eye-tracking sensor; and
identifying the at least one target region using the data indicative of the gaze direction of the viewer.

18. Apparatus for performing object detection, the apparatus comprising:
a receiver configured to receive data representing an image, the image comprising at least one target region and a further region, the at least one target region being identifiable using data indicative of a gaze direction of a viewer of the image; and
a processor configured to:
process a first portion of the data using a first processing scheme to perform object detection in the at least one target region of the image, the first portion representing the at least one target region; and
process a second portion of the data using a second, different, processing scheme, the second portion representing the further region,
wherein processing the first portion of the data using the first processing scheme comprises performing object recognition with a first discriminatory power in the at least one target region, and
wherein processing the second portion of the data using the second processing scheme comprises performing object recognition with a second, different, discriminatory power in the further region.

19. A non-transitory, computer-readable storage medium comprising a set of computer-readable instructions which, when executed by at least one processor, cause the at least one processor to:
receive data representing an image, the image comprising at least one target region and a further region, the at least one target region being identifiable using data indicative of a gaze direction of a viewer of the image;
process a first portion of the data using a first processing scheme to perform object detection in the at least one target region of the image, the first portion representing the at least one target region; and
process a second portion of the data using a second, different, processing scheme, the second portion representing the further region,
wherein processing the first portion of the data using the first processing scheme comprises performing object recognition with a first discriminatory power in the at least one target region, and
wherein processing the second portion of the data using the second processing scheme comprises performing object recognition with a second, different, discriminatory power in the further region.

* * * * *